(12) United States Patent
Choi et al.

(10) Patent No.: US 7,937,044 B2
(45) Date of Patent: May 3, 2011

(54) APPARATUS AND METHOD FOR IMPROVING RECEIVING SENSITIVITY OF PORTABLE RADIO FREQUENCY IDENTIFICATION

(75) Inventors: Hee-Chan Choi, Suwon-si (KR); Seung-Bum Kim, Suwon-si (KR); Dong-Woo Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 544 days.

(21) Appl. No.: 11/965,492

(22) Filed: Dec. 27, 2007

(65) Prior Publication Data

US 2008/0165012 A1    Jul. 10, 2008

(30) Foreign Application Priority Data

Dec. 29, 2006    (KR) .................. 10-2006-0138551

(51) Int. Cl.
*H04B 1/38*    (2006.01)
(52) U.S. Cl. .......... 455/73; 455/63.1; 455/296; 455/522
(58) Field of Classification Search .................. 455/63.1, 455/73, 296, 522
See application file for complete search history.

(56) References Cited

U.S. PATENT DOCUMENTS

| | | | |
|---|---|---|---|
| 6,097,267 A | 8/2000 | Hampel | |
| 6,472,952 B1 | 10/2002 | Sakai et al. | |
| 7,671,720 B1 * | 3/2010 | Martin et al. | 340/10.1 |
| 2005/0026573 A1 | 2/2005 | Cho | |
| 2006/0094458 A1 * | 5/2006 | Kitaji | 455/522 |
| 2006/0252398 A1 | 11/2006 | Park et al. | |

FOREIGN PATENT DOCUMENTS

| | | |
|---|---|---|
| KR | 1020060022082 | 3/2006 |
| KR | 100617322 | 8/2006 |

\* cited by examiner

*Primary Examiner* — Tuan H Nguyen
(74) *Attorney, Agent, or Firm* — The Farrell Law Firm, P.C.

(57) ABSTRACT

Disclosed is an apparatus and a method for improving the receive (Rx) sensitivity of a portable Radio Frequency IDentification (RFID). The portable RFID reader/writer is equipped with a variable phase shifter which is connected between an antenna and a directional coupler and then changes an impedance in the direction of the antenna in response to controlling a phase shift, a level of a reflection signal if a transmit (Tx) signal of the portable RFID reader/writer reflected by the antenna flows into an Rx path is measured, and then the phase shift of the variable phase shifter is controlled in such a manner as to minimize the measured level of the reflection signal. Therefore, calibration is implemented so that an antenna impedance changing in response to a position in which contact is made by a user's hand may have an adaptively optimal antenna reflection coefficient, thereby improving the Rx sensitivity.

4 Claims, 4 Drawing Sheets

APPARATUS AND METHOD FOR IMPROVING RECEIVING SENSITIVITY OF PORTABLE RADIO FREQUENCY IDENTIFICATION

PRIORITY

This application claims priority under 35 U.S.C. §119(a) to an application entitled "Apparatus and Method for Improving Receiving Sensitivity of Portable Radio Frequency Identification" filed in the Korean Industrial Property Office on Dec. 29, 2006 and assigned Serial No. 2006-0138551, the contents of which are incorporated herein by reference.

BACKGROUND OF THE INVENTION

1. Field of the Invention

The present invention relates to a Radio Frequency IDentification (RFID) system, and more particularly to an apparatus and a method for improving receive (Rx) sensitivity in a portable RFID reader/writer.

2. Description of the Related Art

Development of fixed-type RFID technology, which had been used in the circulation of products, etc., has brought about appearance of mobile RFID for individual use of information, such as in goods, movies, music, and others. The term "mobile RFID" signifies that a built-in RFID function is equipped in a mobile terminal, such as a mobile phone, and is referred to as "portable RFID."

Conventionally, an RFID system consists of a reader and a tag. The tag is not equipped with its own power supply. Instead, the tag generates electric power from a Continuous Wave (CW), i.e. a carrier signal, received from the reader, and then uses the generated power. Because the tag has no power supply of its own, the reader transmits to the tag an instruction and a data signal together with a CW, and then transmits another CW corresponding to a source of power supply for the tag while the tag is responding to the transmitted instruction, the data signal, and the CW. While waiting for a response from the tag following the transmission of the instruction, the reader transmits a CW, and then transmits another CW of significantly high power so that the tag may have enough power. During this process the reader is greatly affected, the degree of which depending on the amount of a leakage current of a transmit (Tx) signal during a receive (Rx) operation in which the reader receives a signal from the tag.

One difficult point in implementing an RFID system is that the Tx signal uses the same frequency as the Rx signal. A Tx signal having a strong electric field which has leaked to an Rx path cannot be removed by using a filter, such as a Radio Frequency (RF) Surface Acoustic Wave (SAW) filter. Therefore, only if the amount of the leakage current of the Tx signal which flows into the Rx path is reduced, Rx sensitivity can be improved.

As illustrated in FIG. 1, paths along which a Tx signal flows into an Rx path are classified into two kinds of paths in an RFID reader. The first path corresponds to a path along which the Tx signal leaks to the Rx path due to the isolation characteristic of a directional coupler 104, arranged in the next stage of a Power Amplifier Module (PAM) 102. The second path corresponds to a path along which the Tx signal reflected from an antenna stage of an antenna 100 flows into the Rx path, due to the coupling characteristics of the directional coupler 104.

The isolation characteristic of the directional coupler 104 usually corresponds to an extent of −35 dBm. Accordingly, assuming the power of the Tx signal output from the PAM 102 equals +30 dBm, a power of −5 dBm (i.e., −35 dBm+30 dBm=−5 dBm) passes through the directional coupler 104, and then flows into the Rx path. On the other hand, the reflection coefficient of the antenna 100 usually equals −10 dBm. Hence, after the Tx signal having a power of +30 dBm is reflected from the antenna 100 at a level of +20 dBm, a power of +5 dBm (i.e., 30 dBm−10 dBm−15 dBm=+5 dBm) flows into the Rx path according to the coupling characteristic of −5 dBm of the directional coupler 104. Therefore, reducing the reflecting coefficient of the antenna 100 is essential to improve the Rx sensitivity of the RFID system.

Meanwhile, since the tag does not have its own power supply but uses a received Tx signal from the reader as a source of electricity in the RFID system, only if the reader is equipped with an antenna having a good gain, the reader may transmit enough power to the tag and fully receive a weak signal delivered from the tag. In conditions where most noises occurring in the RFID system (i.e., Tx signal components, isolated by the directional coupler 104, and Tx signal components, which return upon reflecting from the antenna 100 and then couple to one another) have been determined based on unique characteristics of both the directional coupler 104 and the antenna 100, Rx sensitivity can be improved by using an antenna having a good gain.

Since existing fixed-type RFID reader/writers and reader-only terminals have little restrictions on the size of an antenna and can use antennas having good gain, Rx sensitivity thereof are good, and the probability and the distance of reading a tag are also good. On the other hand, antennas are sensitive to external influences. For example, if a person's hand touches an antenna, or is located nearby, the characteristics of the antenna would change, and especially, the variation of its reflection coefficient would be great. Since in fixed-type antennas or reader-only terminals, the distances between external influences such as persons' hands and the antennas are long the antennas in those systems are hardly affected by such external factors.

SUMMARY OF THE INVENTION

Accordingly, the present invention has been made to solve the above-stated problems occurring in the prior art, and the present invention provides an apparatus and a method for improving Rx sensitivity, in which a calibration operation is implemented so that the antenna impedance changed by external factors, such as a person's hand, may have an adaptive optimal antenna reflection coefficient in a portable RFID reader and writer (hereinafter "reader/writer"), thereby enabling improvement of the Rx sensitivity.

In accordance with an aspect of the present invention, there is provided an apparatus for improving the receive (Rx) sensitivity of a portable Radio Frequency IDentification (RFID) reader/writer, including a directional coupler for connecting an antenna to a transmit (Tx) path and an Rx path; a Power Amplifier Module (PAM) for amplifying power of a Tx signal while being joined onto the Tx path; a variable phase shifter connected between the antenna and the directional coupler for changing an impedance in a direction from the PAM to the antenna in response to controlling a phase shift; a reflection signal level measuring unit for measuring a level of a reflection signal produced if the Tx signal reflected by the antenna flows into the Rx path; and a phase shift control unit for controlling the phase shift of the variable phase shifter in such a manner as to minimize the measured level of the reflection signal.

In accordance with another aspect of the present invention, there is provided a method for improving mobile RFID Rx sensitivity in a portable RFID reader/writer, including the steps of measuring a level of a reflection signal produced if a Tx signal of the portable RFID reader/writer reflected by an antenna flows into an Rx path; and controlling the phase shift of a variable phase shifter in such a manner as to minimize the measured level of the reflection signal, wherein the variable phase shifter is connected between the antenna and the directional coupler and is equipped to the portable RFID reader/writer so as to change an impedance in the direction of the antenna in response to controlling the phase shift.

BRIEF DESCRIPTION OF THE DRAWINGS

The above and other exemplary features, aspects, and advantages of the present invention will become more apparent from the following detailed description when taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein will be omitted when it may make the subject matter of the present invention rather unclear.

The present invention provides an apparatus and a method in which a portable RFID reader/writer is equipped with a variable phase shifter which is connected between an antenna and a directional coupler and then changes an impedance in the direction of the antenna in response to phase shift control; a level of a reflection signal if a Tx signal of the portable RFID reader/writer reflected by the antenna flows into an Rx path is measured; and then a phase shift of the variable phase shifter is controlled in such a manner as to minimize the measured level of the reflection signal.

Accordingly, impedance matching between the antenna and a Power Amplifier Module (PAM) is optimized, thereby minimizing the Tx signal reflected from the antenna. In this manner, the amount of leakage current of the Tx signal flowing into the Rx path is minimized, thereby improving Rx sensitivity.

Figure 1:
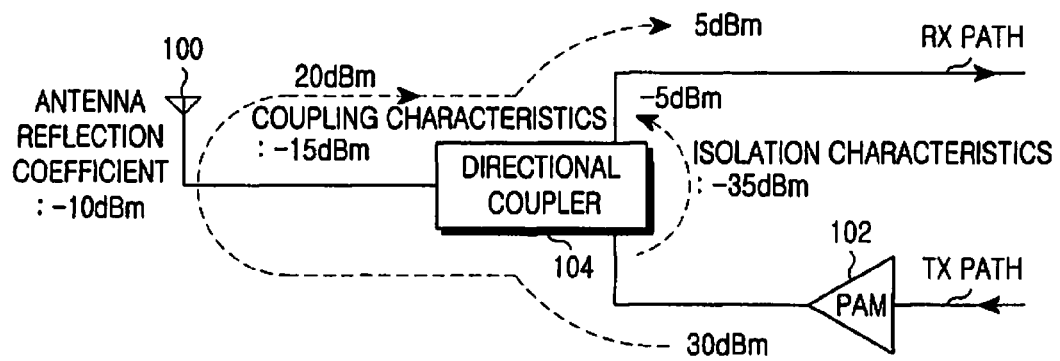
FIG. 1 is a view illustrating the configuration of the Tx/Rx stage of a conventional RFID reader.
Figure 2:
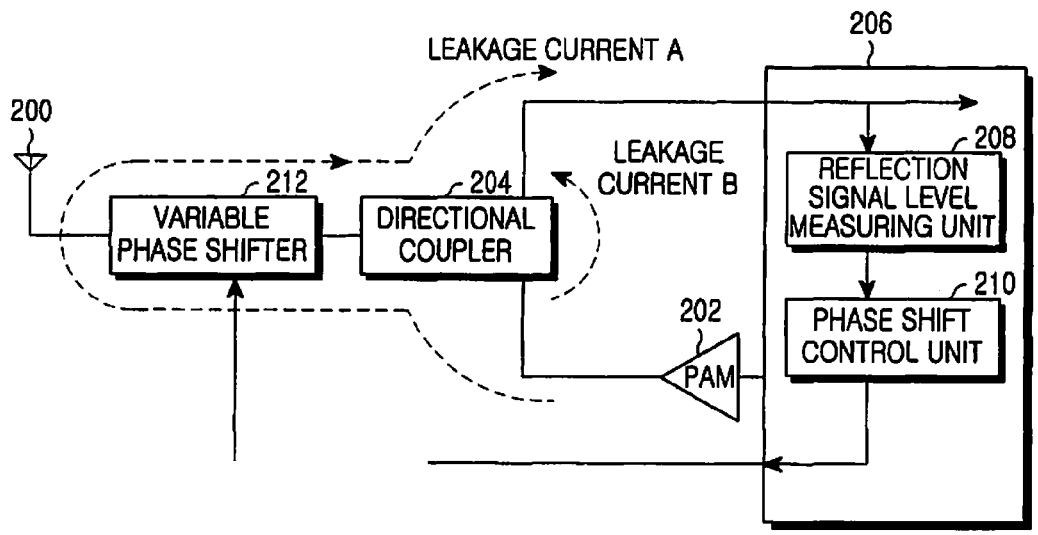
FIG. 2 is a block diagram illustrating the configuration of an RFID reader to which an apparatus for improving RFID Rx sensitivity according to an embodiment of the present invention is applied.

FIG. 2 depicts a block diagram illustrating a configuration of an RFID reader to which an apparatus for improving RFID Rx sensitivity according to an embodiment of the present invention is applied. Along a Tx path on which a Tx signal is output from an RFID chip 206, a PAM 202 amplifies power of the Tx signal, and then outputs an amplified Tx signal to a directional coupler 204. The directional coupler 204 connects an antenna 200 to the Tx path and/or to an Rx path, and a variable phase shifter 212 is connected between the antenna 200 and the directional coupler 204. The variable phase shifter 212 changes an impedance in a direction from the PAM 202 to the antenna 200 in response to phase shift control of a phase shift control unit 210.

Also, a reflection signal level measuring unit 208 is connected on the Rx path to the directional coupler 204. The reflection signal level measuring unit 208 measures a level of a reflection signal produced if the Tx signal reflected by the antenna 200 flows into the Rx path. The phase shift control unit 210 controls a phase shift of the variable phase shifter 212 in such a manner as to minimize the measured level of the reflection signal.

FIG. 2 shows an example in which the reflection signal level measuring unit 208 and the phase shift control unit 210 are embodied within the RFID chip 206. In the same manner as a conventional case, the RFID chip 206 not only exchanges a tag and Tx/Rx signals through the antenna 200, but also includes the reflection signal level measuring unit 208 and the phase shift control unit 210 according to an embodiment of the present invention.

Leakage current of the Tx signal is classified into a leakage current B flowing into the Rx path according to the isolation characteristics of the directional coupler 204, and a leakage current A generated by a reflection signal which is reflected by the antenna 200 and then flows into the Rx path according to the coupling characteristics of the directional coupler 204. In the present invention, a component of the leakage current A is minimized, which corresponds to the main component of a leakage component between the leakage current A and the leakage current B.

At first, the antenna 200 is manufactured in such a manner as to minimize the leakage current A component. This indicates that the antenna has been manufactured in such a manner as to be suitable for the impedance of the PAM 202. However, a reflection coefficient component increases due to a position in which the hand of a user who holds a terminal touches the terminal, and the like, and this means that the impedance of the antenna 200 has changed. Accordingly, in the present invention, a phase shift of the variable phase shifter 212 is controlled, and then the impedance of the PAM 202 is matched, as well as possible, to the impedance of the antenna, which has changed due to the influence of a user's hand, and the like.

Before carrying out an operation of reading the tag, the RFID chip 206 transmits a carrier signal, and then enables the reflection signal level measuring unit 208 to measure the reflection level of the Tx signal flowing into the Rx path. Then the phase shift control unit 210 compares the measured reflection level with a reference level. The reference level represents a level that is set to a measured reflection level, following the measurement of the reflection level of a Tx signal which is reflected by the antenna 200 and then flows into the Rx path when external influence is absent. If the reflection level is larger than the reference level, as the phase shift control unit 210 changes the phase shift control value on the variable phase shifter 212, the phase shift control unit 210 performs an operation of updating impedance matching.

The operation process described above can be implemented in two schemes. In the first scheme, if impedance matching is initiated, as a phase shift control value on the variable phase shifter 212 is changed from a preset minimum value to a preset maximum value by stages, all reflection levels of the Tx signal flowing into the Rx path are measured. According to this scheme, a reflection signal level is measured closely and the best matching phase shift control value can be found. However, there is a disadvantage in that the operation takes a long time.

In the second scheme, shapes resembling hands holding a terminal are pre-examined, phase shift control values corresponding to those shapes are sampled, a lookup table is prepared for the sampled phase shift control values and is stored in an RFID reader to be utilized. If a measured amount of leakage current of a Tx signal, i.e. a reflection signal level, is larger than a reference level, as the RFID chip 206 changes a phase shift control value according to data stored in the lookup table, the RFID chip 206 enables the variable phase shifter 212 to operate, and then enables the reflection signal level measuring unit 208 to measure the reflection signal level. Thereafter, with a sampled phase shift control value, as the reference, corresponding to a reflection signal level having a minimum level (i.e., the smallest leakage current of a Tx signal) among measured reflection signal levels, a reflection signal level is closely measured with respect to the reference to adjacent sampled phase shift control values. According to the second scheme, there is an advantage that it takes a short time to operate. However, there is a disadvantage in that the second scheme is less sophisticated than the first scheme.

Figure 3:
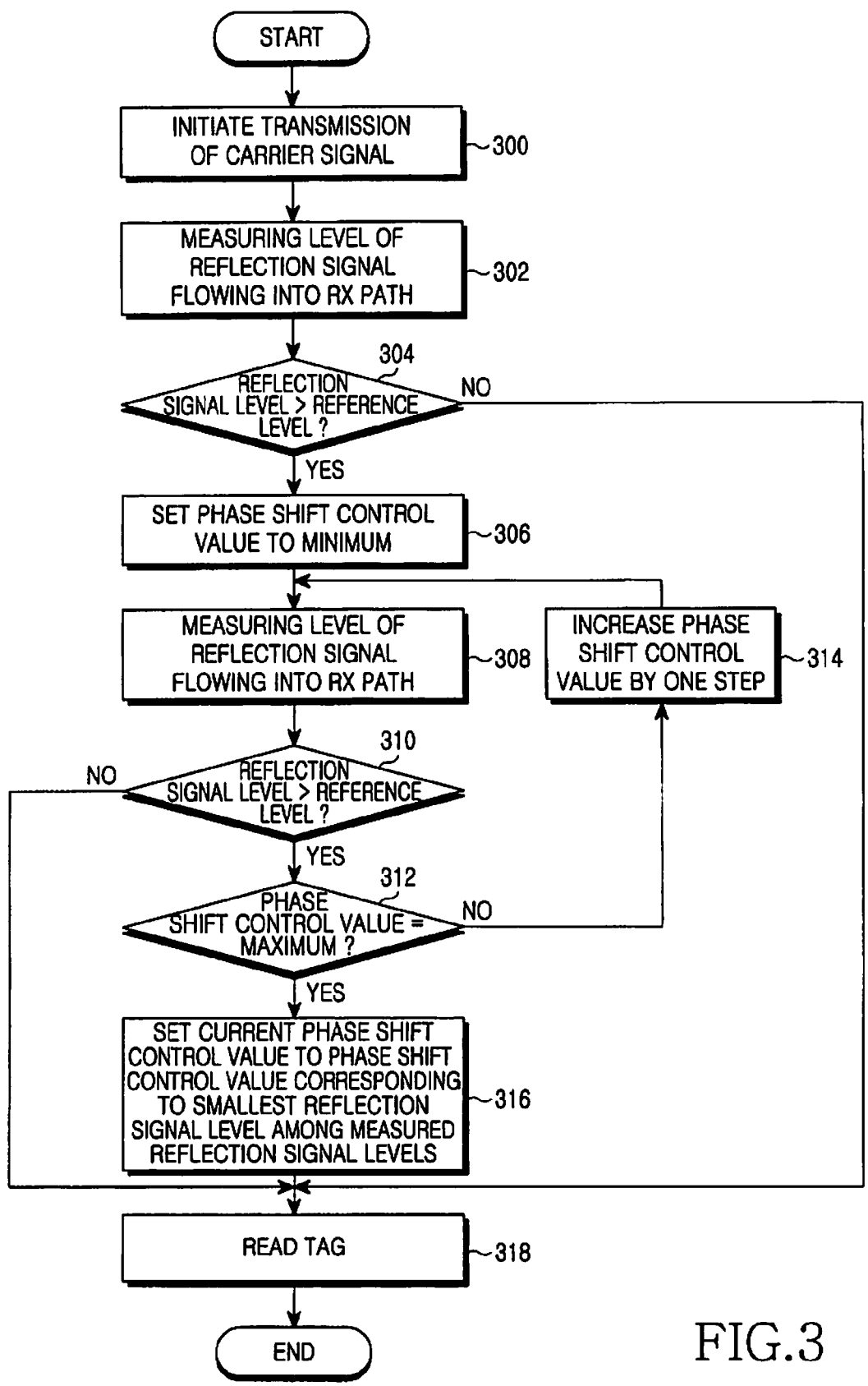
FIG. 3 is a flowchart illustrating a calibration operation with respect to a variable phase shifter according to an embodiment of the present invention.

FIG. 3 illustrates a flowchart for a calibration operation according to an embodiment of the present invention when the first scheme is applied.

If a terminal enters an RFID mode, before the RFID reader reads a tag, as the RFID reader changes the phase shift control value of the variable phase shifter 212 in response to a changed antenna impedance, the RFID reader begins to perform an impedance calibration operation.

First, in step 300, a carrier signal begins to be transmitted, and the carrier signal continues to be transmitted until the calibration is completed. The transmitted carrier signal travels along the Tx path, and then a part of the transmitted carrier signal returns, the level of which depending on a reflection coefficient of the antenna 200. A returning reflection signal flows into the Rx path according to the coupling characteristics of the directional coupler 204.

In step 302, the RFID reader enables the reflection signal level measuring unit 208 to measure a level of the reflection signal flowing into the Rx path in this manner. In step 304, the RFID reader compares the level of the reflection signal flowing into the Rx path to a reflection level (i.e., a preset reference level) of the Tx signal which is reflected by a reflection coefficient during an optimal state and then returns.

If the reflection signal level is less than or equal to the reference level, the phase shift control value at that time is maintained, and then the procedure proceeds to step 318 in which a tag read instruction is performed.

On the other hand, if the reflection signal level is greater than the reference level, an operation of calibration in steps 306 to 316 (i.e., an optimization operation on an antenna reflection coefficient) is to be performed.

In steps 306 to 316, as a phase shift control value on the variable phase shifter 212 is changed from a preset minimum value to a preset maximum value by stages, a phase shift control value on which a reflection signal level is measured as the minimum is found, and then a phase shift control value on the variable phase shifter 212 is set to the found phase shift control value. At this time, if there is a phase shift control value on which the reflection signal level is less than the reference level, as the phase shift control value is maintained, step 318, in which a tag is read, is performed. Otherwise, if a reflection signal level which is less than the reference level is not measured despite all changes, the procedure sets the phase shift control value as which the smallest level has been measured among measured reflection signal levels, and then proceeds to step 318 in which the tag is read.

Figure 4A:
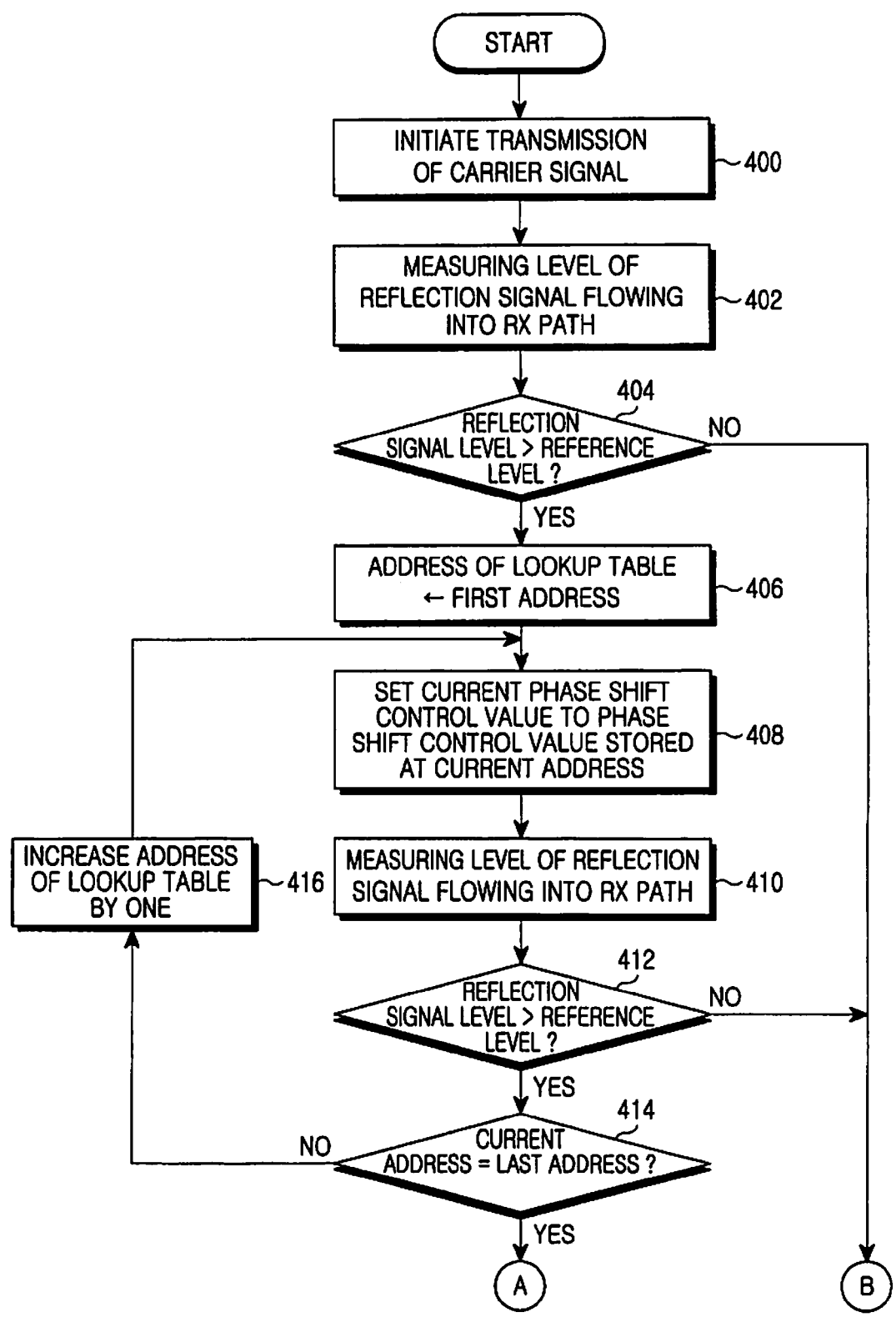
FIGS. 4A and 4B are a flowchart illustrating a calibration operation with respect to a variable phase shifter according to another embodiment of the present invention.
Figure 4B:
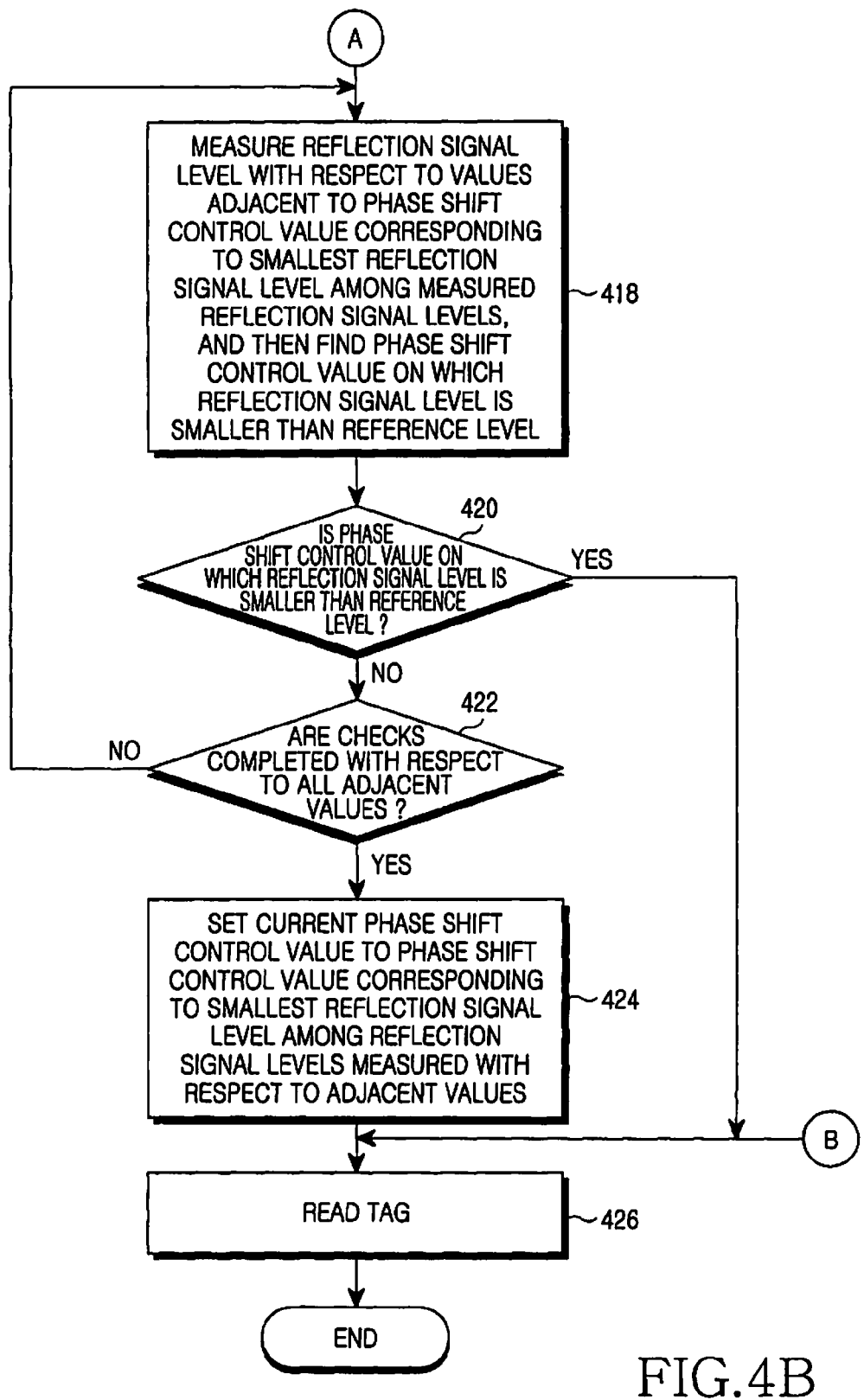

FIGS. 4A and 4B show a flowchart for a calibration process according to another embodiment of the present invention if the above-described second scheme s is applied. In FIGS. 4A and 4B, the opening steps 400 to 404 coincide with steps 300 to 304 of FIG. 3, and the second scheme also coincides with the first scheme, in that if a reflection signal level is less than or equal to a reference level, the phase shift control value at that time is maintained and the procedure proceeds to step 426 in which a tag read instruction is to be performed.

On the other hand, if the reflection signal level is greater than the reference level, an operation of calibration in steps 406 to 424 (i.e., an optimization operation on an antenna reflection coefficient with reference to a lookup table) is to be performed. To start, in steps 406 to 416, as described above, as sampled phase shift control values which have already been stored in the lookup table are changed from a value stored at the first address of the lookup table to a value stored at the last address of the lookup table, a phase shift control value on the variable phase shifter 212 is set, and then a reflection signal level is measured.

At this time, if there is a phase shift control value on which a reflection signal level that is less than or equal to the reference level is measured, the phase shift control value is maintained and the procedure proceeds to step 426 in which the tag is read.

Otherwise, if reflection signal levels according to all phase shift control values existing in the lookup table do not satisfy the reference level, the procedure performs steps 418 to 422, in which the procedure finds a phase shift control value on which a reflection signal level is less than the reference level with respect to values adjacent to the sampled phase shift control value corresponding to the smallest reflection signal level among reflection signal levels measured in steps 406 to 416.

For example, assume that a range of a phase shift control value is 0 V to 2 V, and the values stored in the lookup table are 0.3 V, 0.9 V, 1.4 V, and 1.8 V. If a minimum reflection signal level exists at 0.9 V but does not satisfy a reference level, as the RFID reader changes a phase shift control value from 0.3 V to 1.4 V, the RFID reader repeats measuring of a reflection signal level.

At this time, if there is a phase shift control value on which a reflection signal level that is less than or equal to the reference level is measured, as the phase shift control value is maintained, the procedure proceeds to step 426 in which the tag is read.

Otherwise, if reflection signal levels according to all adjacent values do not satisfy the reference level, the procedure passes through step 424 in which the procedure sets a phase shift control value on the variable phase shifter 212 to an adjacent value corresponding to the smallest reflection signal level among reflection signal levels measured in steps 418 to 422, and then proceeds to step 426.

Hence, the antenna 200 may have a minimum reflection coefficient by phase shift calibration on the variable phase shifter 212, such that the impedance in the direction of the antenna 200 is controlled, and the amount of leakage current of the Tx signal which is reflected by an antenna stage and then flows into the Rx path is minimized, thereby enabling improvement of Rx sensitivity.

In performing a calibration operation according to embodiments of the present invention, as described above, power of the Tx signal is set to a relatively weak value so that other external terminals may not be affected.

In the above-described embodiments of the present invention, while an example in which the present invention is applied to a portable RFID reader is described, the present invention may be applied not only to a portable RFID reader, but also to all kinds of mobile RFID readers/writers for recording information in a tag and reading recorded information without special changes in form in the same manner.

Also, while a reflection signal level measuring unit 208 and a phase shift control unit 210 are equipped within an RFID chip 206, they can be realized as a special configuration element outside of the RFID chip 206.

Hence, the spirit and scope of the present invention must be defined not by described embodiments thereof but by the claims and equivalents of the claims.

As described above, in the present invention, an operation of calibration is performed so that an antenna may have a minimum reflection coefficient, which in turn minimizes the amount of leakage current of a Tx signal that is reflected by an antenna stage and then flows into an Rx path. Accordingly, there is such an advantage that Rx sensitivity is improved.

While the invention has been shown and described with reference to certain exemplary embodiments thereof, it will be understood by those skilled in the art that various changes in form and details may be made therein without departing from the spirit and scope of the invention.

What is claimed is:

1. An apparatus for improving a receive (Rx) sensitivity of a portable Radio Frequency IDentification (RFID) reader/writer, the apparatus comprising:
   a directional coupler for connecting an antenna to a transmit (Tx) path and an Rx path;
   a Power Amplifier Module (PAM) for amplifying power of a Tx signal while being joined onto the Tx path;
   a variable phase shifter, connected between the antenna and the directional coupler, for changing an impedance in a direction from the PAM to the antenna to control a phase shift;
   a reflection signal level measuring unit for measuring a level of a reflection signal produced if the Tx signal reflected by the antenna flows into the Rx path; and
   a phase shift control unit for controlling the phase shift of the variable phase shifter to minimize the measured level of the reflection signal,
   wherein, if the level of the reflection signal is larger than a reference level, as the phase shift control unit changes a phase shift control value on the variable phase shifter from a preset minimum value to a preset maximum value by stages, the phase shift control unit finds a phase shift control value on which the level of the reflection signal is measured as a minimum, and then sets a phase shift control value on the variable phase shifter to the found phase shift control value.

2. An apparatus for improving a receive (Rx) sensitivity of a portable Radio Frequency IDentification (RFID) reader/writer, the apparatus comprising:
   a directional coupler for connecting an antenna to a transmit (Tx) path and an Rx path;
   a Power Amplifier Module (PAM) for amplifying power of a Tx signal while being joined onto the Tx path;
   a variable phase shifter, connected between the antenna and the directional coupler, for changing an impedance in a direction from the PAM to the antenna to control a phase shift;
   a reflection signal level measuring unit for measuring a level of a reflection signal produced if the Tx signal reflected by the antenna flows into the Rx path; and
   a phase shift control unit for controlling the phase shift of the variable phase shifter to minimize the measured level of the reflection signal,
   wherein, if the level of the reflection signal is larger than a reference level, as the phase shift control unit changes a phase shift control value on the variable phase shifter into sampled values previously stored in a lookup table, the phase shift control unit finds a phase shift control value on which the level of the reflection signal is measured as a minimum, and then sets a phase shift control value on the variable phase shifter to the found phase shift control value.

3. A method for improving a portable Radio Frequency IDentification (RFID) receive (Rx) sensitivity in a portable RFID reader/writer, the method comprising the steps of:
   measuring a level of a reflection signal produced if a transmit (Tx) signal of the portable RFID reader/writer reflected by an antenna flows into an Rx path; and
   controlling a phase shift of a variable phase shifter in such a manner as to minimize the measured level of the reflection signal, wherein the variable phase shifter is connected between the antenna and the directional coupler, and is equipped to the portable RFID reader/writer to change an impedance in the direction of the antenna to control the phase shift,
   wherein the step of controlling a phase shift of a variable phase shifter comprises the steps of:
   comparing the level of the reflection signal with a reference level; and
   finding a phase shift control value on which the level of the reflection signal is measured as a minimum, and then setting a phase shift control value on the variable phase shifter to the found phase shift control value, if the level of the reflection signal is larger than a reference level, while changing a phase shift control value on the variable phase shifter from a preset minimum value to a preset maximum value by stages.

4. A method for improving a portable Radio Frequency IDentification (RFID) receive (Rx) sensitivity in a portable RFID reader/writer, the method comprising the steps of:
   measuring a level of a reflection signal produced if a transmit (Tx) signal of the portable RFID reader/writer reflected by an antenna flows into an Rx path; and
   controlling a phase shift of a variable phase shifter in such a manner as to minimize the measured level of the reflection signal, wherein the variable phase shifter is connected between the antenna and the directional coupler, and is equipped to the portable RFID reader/writer to change an impedance in the direction of the antenna to control the phase shift,
   wherein the step of controlling a phase shift of a variable phase shifter comprises the steps of:
   comparing the level of the reflection signal with a reference level; and
   finding a phase shift control value on which the level of the reflection signal is measured as a minimum, and then setting a phase shift control value on the variable phase shifter to the found phase shift control value, if the level of the reflection signal is larger than a reference level, while changing a phase shift control value on the variable phase shifter into sampled values previously stored in a lookup table.

* * * * *